(12) United States Patent
Chan et al.

(10) Patent No.: US 7,048,144 B1
(45) Date of Patent: May 23, 2006

(54) TEAKETTLE WITH CLOSURE INSIDE SPOUT

(75) Inventors: Eric Chan, New York, NY (US); Jeff Miller, New York, NY (US)

(73) Assignee: Helen of Troy Limited, Bridgetown (BB)

( * ) Notice: Subject to any disclaimer, the term of this patent is extended or adjusted under 35 U.S.C. 154(b) by 0 days.

(21) Appl. No.: 10/800,076

(22) Filed: Mar. 15, 2004

(51) Int. Cl.
  *G01F 11/00* (2006.01)
(52) U.S. Cl. .......................... 222/1; 222/469; 222/474
(58) Field of Classification Search ................ 222/1, 222/465.1, 469, 470, 472, 473, 474
See application file for complete search history.

(56) References Cited

U.S. PATENT DOCUMENTS

| | | | | |
|---|---|---|---|---|
| 639,881 | A | * | 12/1899 | Bailey ................. 222/470 |
| 1,266,396 | A | * | 5/1918 | Brown ................. 222/473 |
| 2,040,087 | A | * | 5/1936 | Hackl ................. 222/469 |
| 2,102,349 | A | | 12/1937 | Baron |
| 2,169,239 | A | | 8/1939 | Hacmac |
| 2,294,594 | A | | 9/1942 | Bloomfield |
| 2,490,194 | A | * | 12/1949 | Barclay ............... 222/470 |
| 2,574,338 | A | | 11/1951 | Lewis |
| 2,624,493 | A | | 1/1953 | Porter |
| 2,718,338 | A | | 9/1955 | Cicero |
| 3,396,876 | A | | 8/1968 | Workman et al. |
| 4,756,442 | A | | 7/1988 | Halm et al. |
| 4,813,368 | A | | 3/1989 | Hutter, III et al. |
| 5,135,128 | A | | 8/1992 | Kuhn |
| 5,307,950 | A | | 5/1994 | Li |
| 6,006,959 | A | * | 12/1999 | Naden et al. ........... 222/469 |
| 6,513,683 | B1 | | 2/2003 | Kull |

* cited by examiner

*Primary Examiner*—Joseph A. Kaufman
(74) *Attorney, Agent, or Firm*—Seyfarth Shaw LLP (57) ABSTRACT

A teakettle has a vessel defining a storage chamber with a spout, a handle connected to the vessel and including a hollow portion communicating with the chamber, a closure member disposed within the spout and movable for opening and closing the spout, an actuator on the handle, and a linkage assembly extending through the hollow portion of the handle and coupling the actuator to the closure member for opening the closure member inwardly of the spout in response to actuation of the actuator.

18 Claims, 7 Drawing Sheets

TEAKETTLE WITH CLOSURE INSIDE SPOUT

BACKGROUND

This application relates to portable liquid containers and, in particular, containers which may be used for heating, transporting and dispensing liquid beverages, such as coffee, tea and the like. The application relates in particular to kettles, such as teakettles, and techniques for opening and closing spouts of such kettles.

Traditional kettles are well known in the art for use in heating liquid beverages or the like. Such kettles are provided with at least one aperture for filling the container and/or discharging liquids from the container. The aperture may be located in the top of the vessel wall of the container or may be in the nature of a spout projecting from the vessel wall. In some cases the container may include both a top aperture and a spout aperture, either or both of which may be provided with apparatus for opening and closing the aperture.

Various types of actuation mechanisms have been provided for controlling the operation of such closure structures, including mechanisms which rely on gravity and the weight of the container in response to lifting of a container handle. Other mechanisms require the movement of the closure device outwardly of the container, or utilize actuation mechanisms which are complicated, unsightly, or both. Others utilize handles which project laterally from the vessel wall and can interfere with adjacent vessels or burners on stovetops or the like, or can be subject to accidental bumping in use.

SUMMARY

There are disclosed herein an improved container and a method for opening and closing a container which avoid disadvantages of prior containers and techniques while affording additional structural and operating advantages.

A disclosed embodiment of portable liquid container comprises a vessel defining a liquid storage chamber and having a spout communicating with the chamber, a handle assembly connected to the vessel and including a hollow portion communicating with the chamber, a closure member disposed within the spout for movement between a closed position closing the spout and an open position accommodating flow of liquid through the spout, bias structure resiliently urging the closure member to the closed position, an actuator carried by the handle assembly for movement between actuating and release positions, and a linkage assembly extending through the hollow portion of the handle assembly and coupling the actuator to the closure member for moving the closure member to its closed position in a direction inwardly of the spout in response to movement of the actuator to its actuating position.

There is also disclosed a container of the type set forth which has a handle assembly including a hollow metal tube connected to the vessel and a thermally insulating sleeve assembly enclosing a portion of the tube and including an actuator portion.

There is also disclosed a method of opening and closing a spout of a kettle having a storage chamber and a hollow tubular handle communicating with the chamber, the method comprising: disposing a closure member within the spout and an actuator on the handle, concealing a linkage assembly within the chamber and the handle for coupling the actuator to the closure member, and moving the actuator in response to grasping of the handle by a user's hand to move the closure member inwardly of the spout to an open position.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
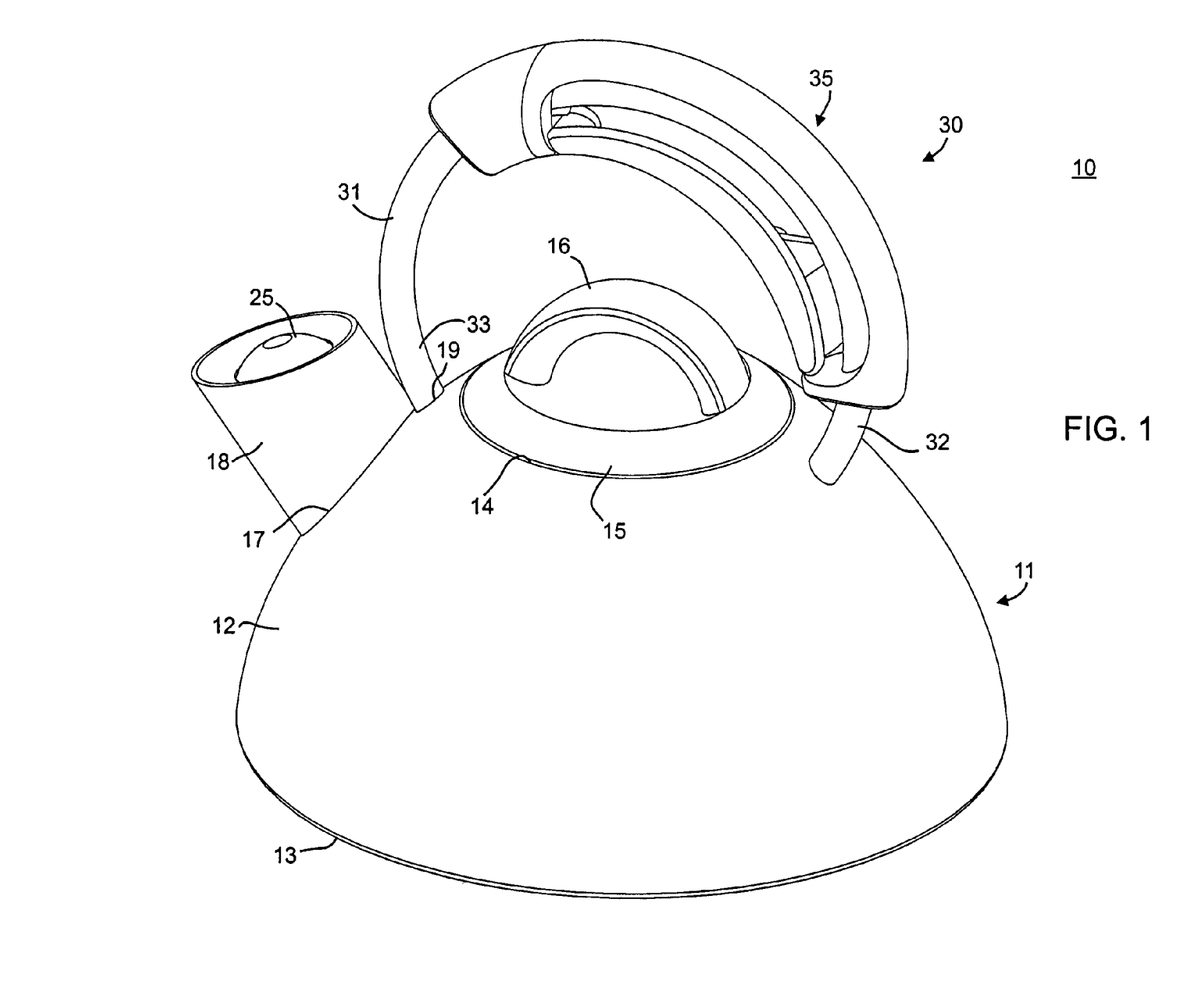
FIG. 1 is a perspective view of a teakettle.
Figure 2:
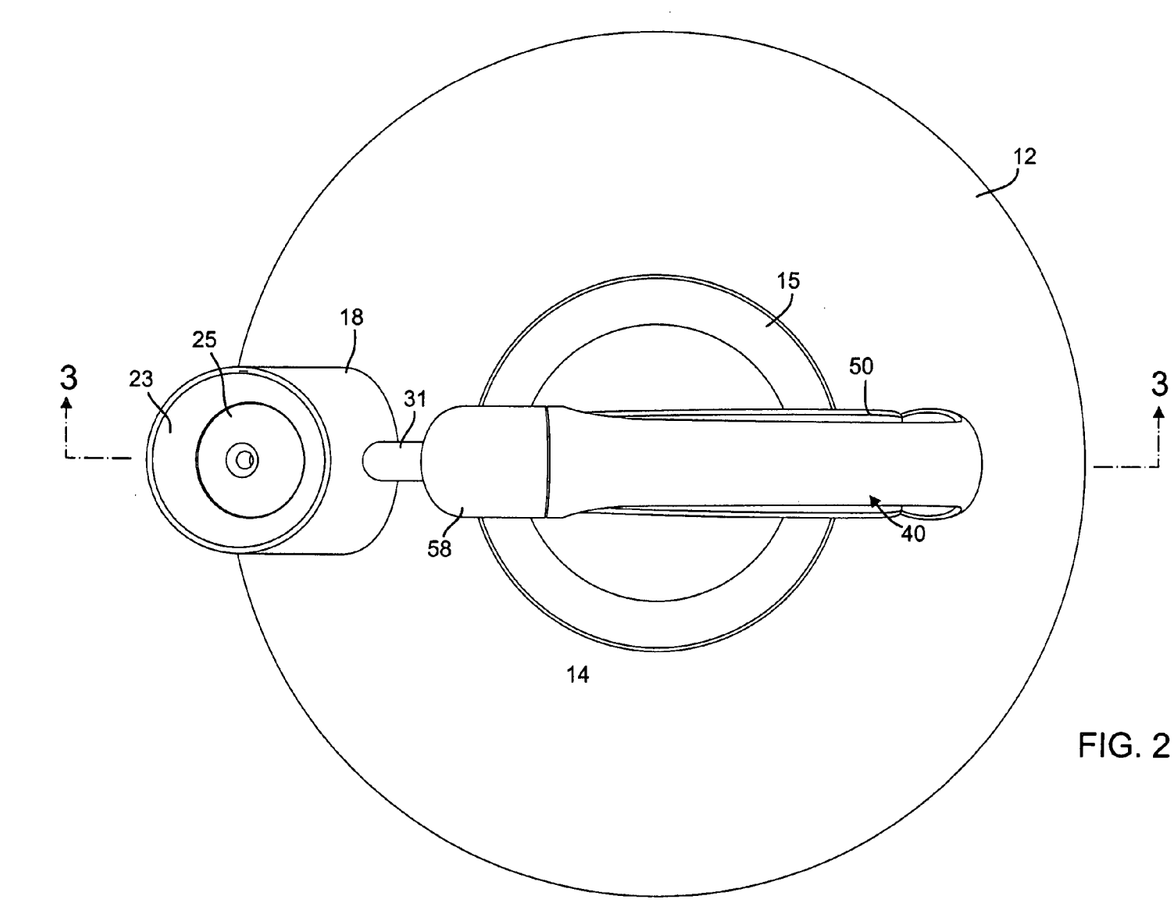
FIG. 2 is a top plan view of the teakettle of FIG. 1.

Referring to FIGS. 1 and 2, there is illustrated a container in the nature of a teakettle, generally designated by the numeral 10, including a liquid-containing vessel 11 having a generally dome-shaped sidewall 12 closed by a circular bottom wall 13 and defining a liquid storage chamber 11a therein. The sidewall 12 is provided with a circular top aperture 14 which is closable by a removable lid 15 having a bail-type handle 16. Also formed in the sidewall 12 is a circular aperture 17 encircled by generally cylindrical spout 18, which is fixed to and projects laterally outwardly and upwardly from the sidewall 12. Also formed in the sidewall 12 between the spout aperture 17 and the top aperture 14 is a handle aperture 19.

Figure 3:
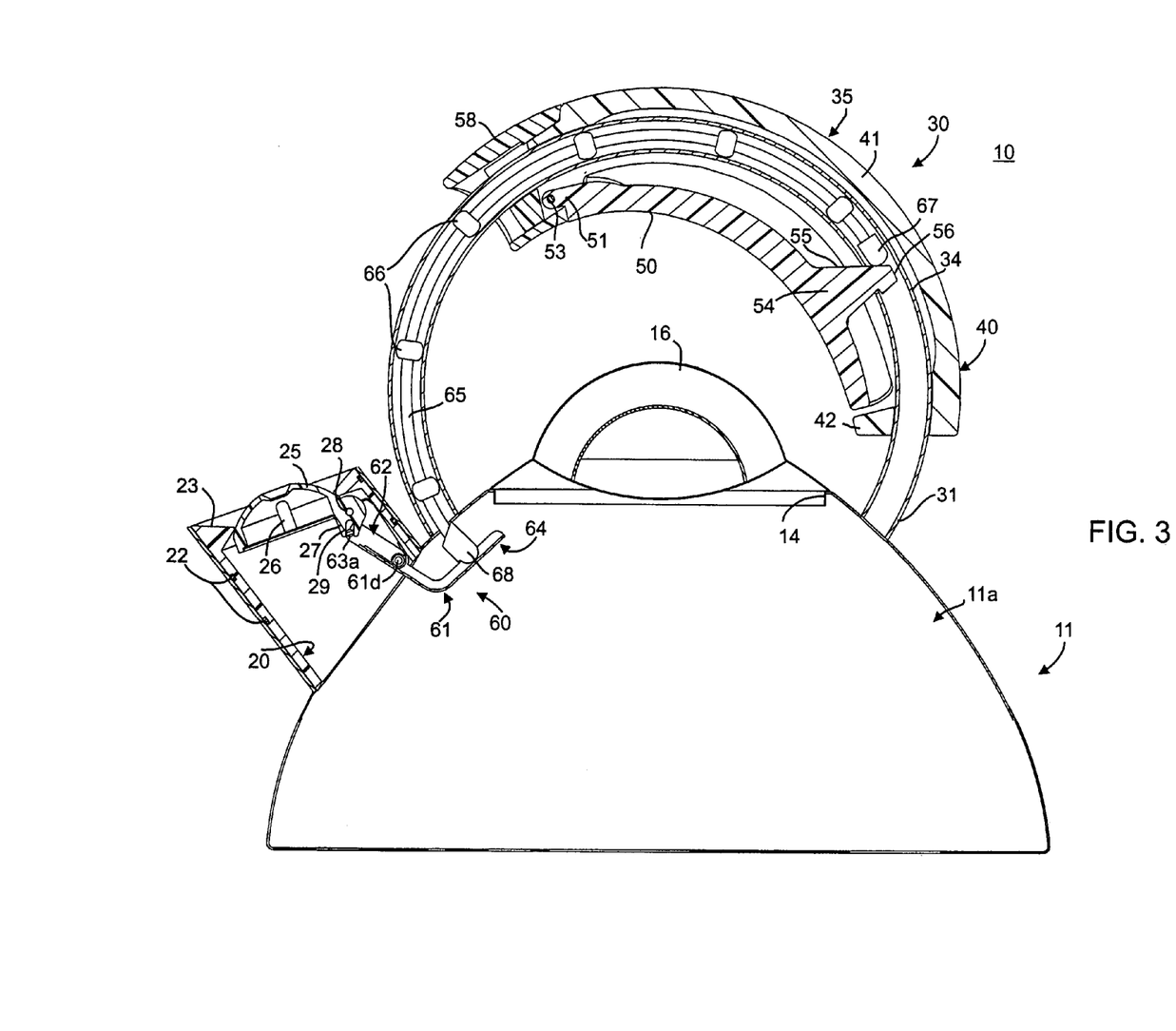
FIG. 3 is a sectional view taken generally along the line 3—3 in FIG. 2 and showing the spout closed.
Figure 4:
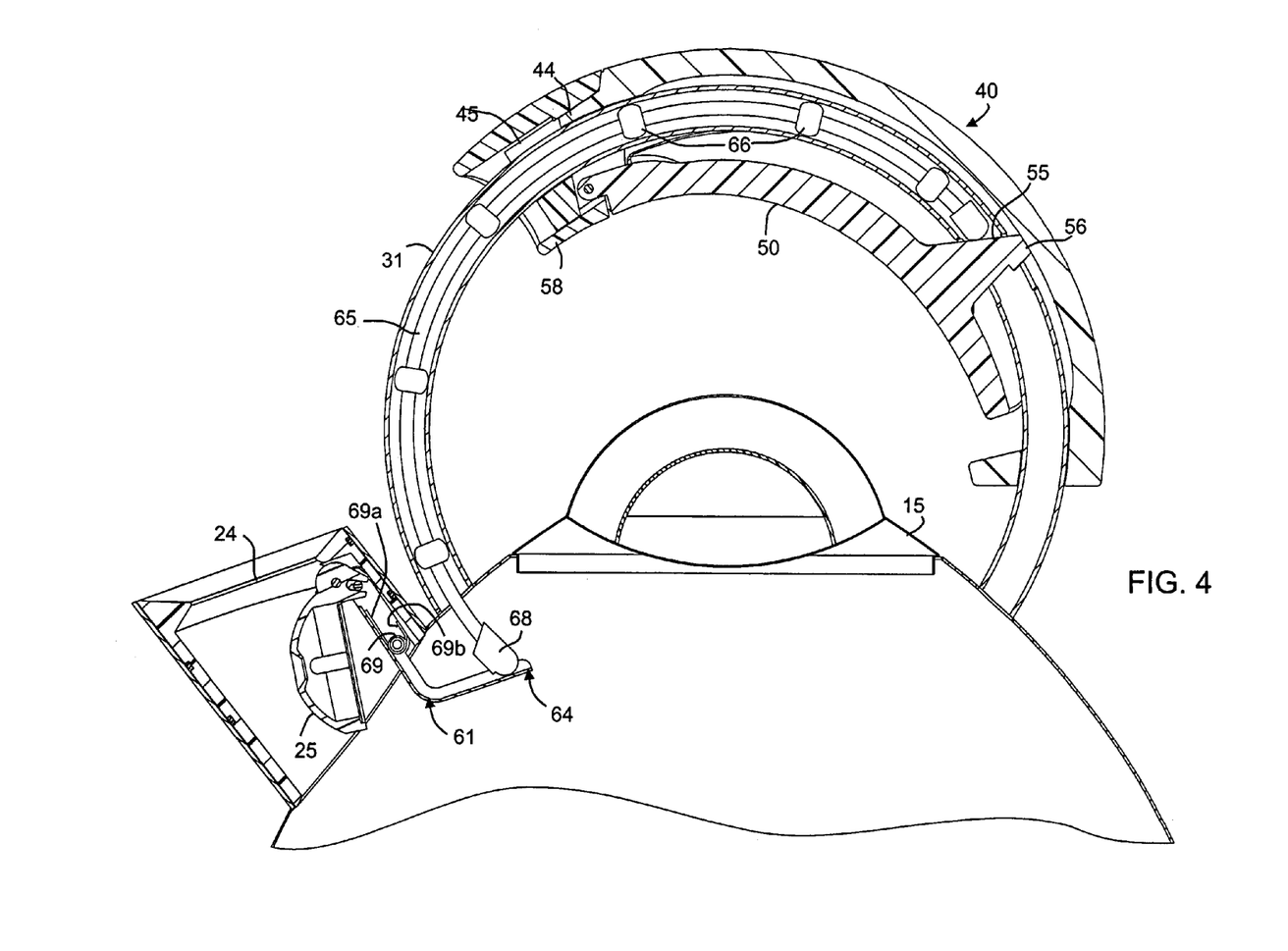
FIG. 4 is an enlarged, fragmentary view similar to FIG. 3 and showing the spout open.
Figure 9:
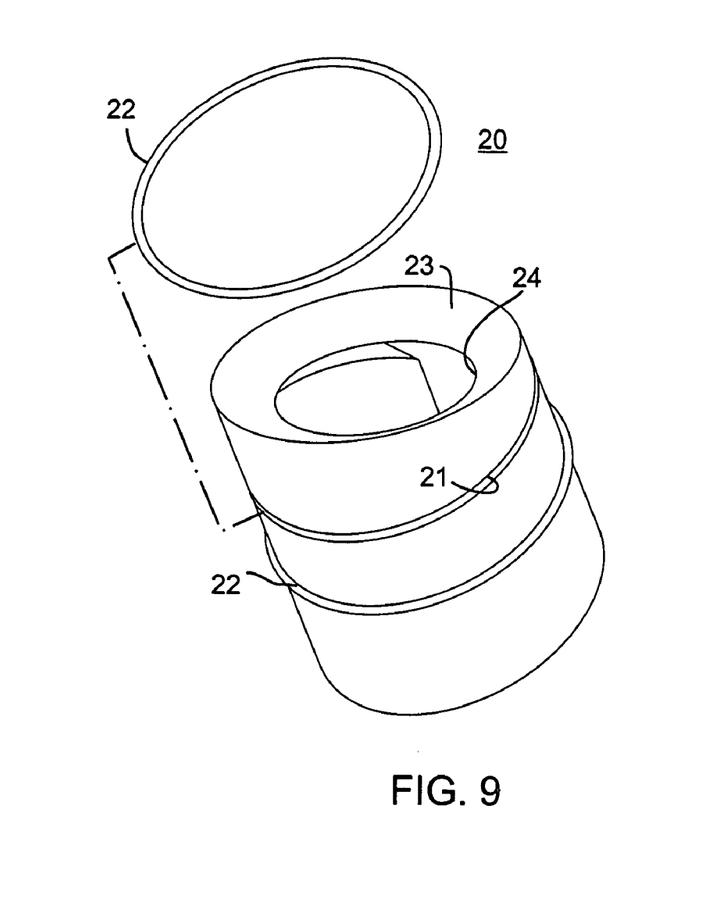
FIG. 9 is an enlarged, front perspective view of the spout liner and ring seals of the teakettle of FIG. 1, with a portion of one seal broken away.

Referring also to FIGS. 3, 4 and 9, a generally cylindrical liner 20 is received within the spout 18, the liner 20 having circumferential grooves 21 in the outer surface thereof receiving O-ring seals 22 for sealing against the inner surface of the spout 18. The liner 20 may be formed of a suitable plastic or metal material and may be retained in place in the spout 18 by any suitable means. The liner 20 is provided at its outer end with a radially inwardly projecting annular flange 23 which defines a circular aperture 24 (FIG. 4) closable by a circular, generally domed-shaped closure member 25, which may be provided with a suitable whistle mechanism 26. Integral with the closure member 25 and projecting radially outwardly therefrom is an arm 27, which is pivotally mounted by means of a pivot pin 28 received in complementary bores in the liner 20, for movement between a closed position (FIG. 3) closing the aperture 24 and an open position (FIG. 4) opening the aperture 24 and permitting the flow of liquid therethrough. Formed in the arm 28 is a slot 29 for a purpose to be explained more fully below.

The kettle 10 is provided with a handle assembly 30, which includes an elongated hollow tube 31 which is circular in transverse cross section and extends along a part-circular arc terminating at distal and proximal ends 32 and 33 which are, respectively, fixed to the sidewall 12 of the vessel 11. More specifically, as can best be seen in FIGS. 3 and 4, the tube 31 spans the top opening 14 in the vessel 11, the proximal end 33 encircling the aperture 19 in the domed sidewall 12 for communication with the chamber 11a. Formed diametrically through the tube 31 adjacent to its distal end 31 is an elongated slot 34 (FIG. 3).

Figures 5, 6:
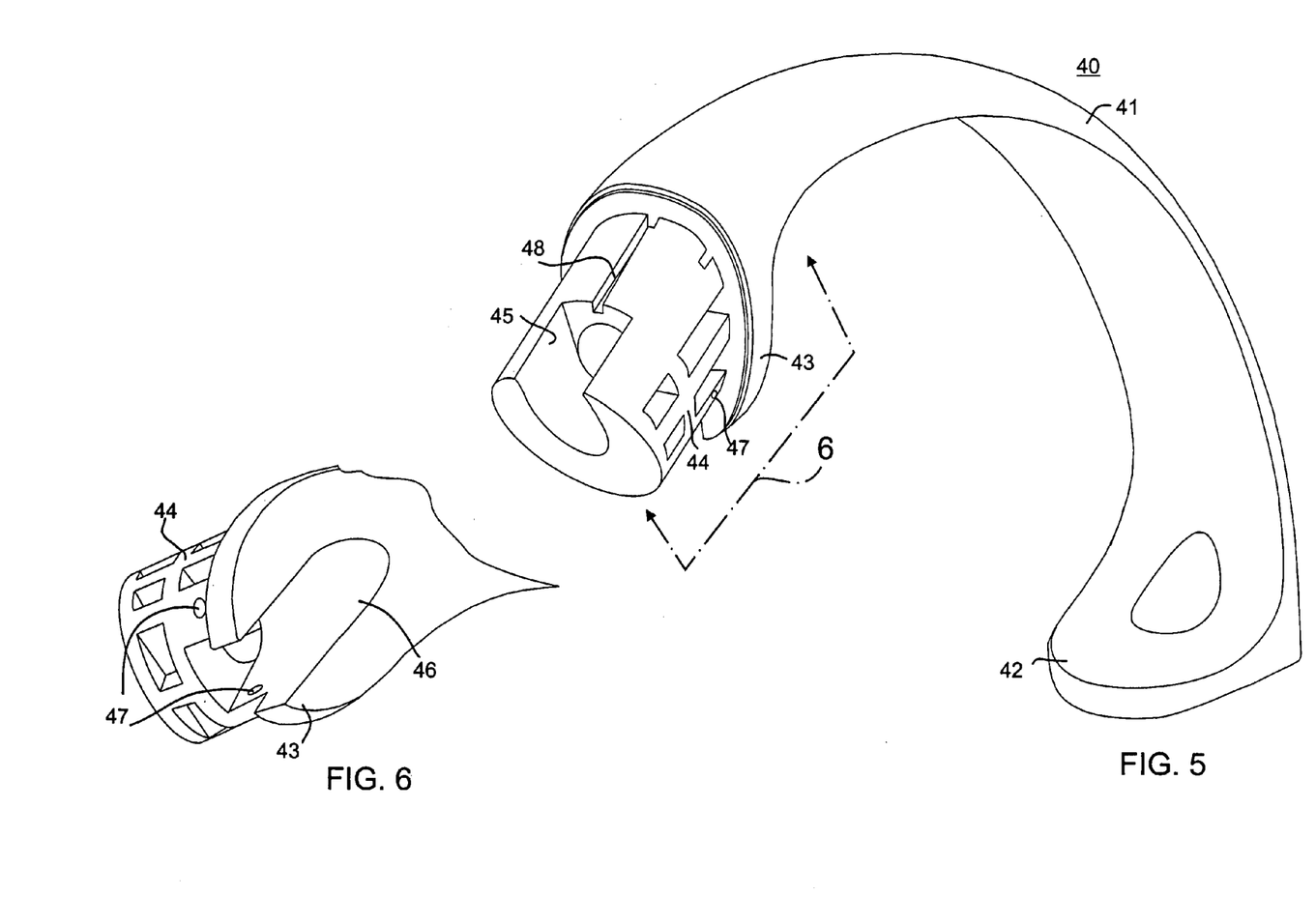
FIG. 5 is an enlarged front perspective view of the sleeve of the handle assembly of the teapot of FIG. 1.
FIG. 6 is a fragmentary, bottom rear perspective view of a portion of the sleeve of FIG. 5 designated by the line 6—6.

Referring also to FIGS. 5 and 6, the handle assembly 30 includes a sleeve assembly 35 which, in turn, includes a sleeve or cover 40 having an elongated, arcuately curved body 41, which may be formed of a suitable plastic material. The body 41 is generally saddle-shaped in transverse cross section over most of its length and is provided at one end with a rear ring 42, which receives the tube 31 therethrough, and is provided that the other end thereof with a front yoke 43, which also receives the tube 31 therethrough. Thus, between the rear ring 42 and the front yoke 43, the body 41 overlies the tube 31 and is spaced a predetermined distance radially outwardly therefrom, as best be seen in FIGS. 3 and 4, providing a thermally insulating air gap therebetween. Projecting forwardly from the front yoke 43 is a generally cylindrical ring 44 provided at its forward end with a generally U-shaped top notch 45 in the upper surface thereof (FIG. 5), through which the tube 31 extends. The front yoke 43 defines a generally U-shaped slot 46 in the underside thereof which extends into the ring 44 (FIG. 6). A pivot hole 47 extends laterally through the slotted portion of the ring 44 (FIG. 6), and a longitudinally extending locking groove 48 is formed in the upper surface of the ring 44.

Figure 7:
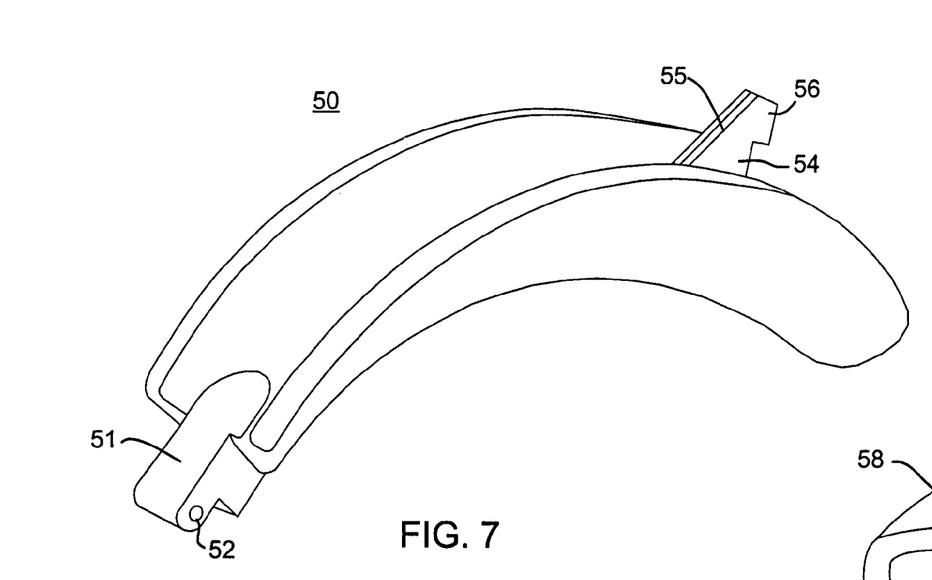
FIG. 7 is a front top perspective view of the actuator lever of the handle assembly of the teapot of FIG. 1.
Figure 8:
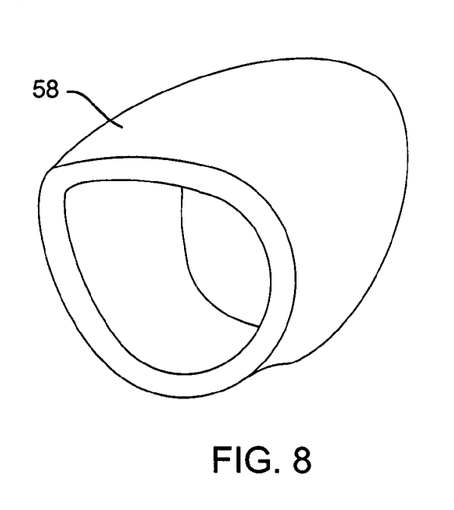
FIG. 8 is an enlarged, front perspective view of the collar of the handle assembly of the teapot of FIG. 1.

Referring also to FIG. 7, the sleeve assembly 35 also includes an elongated, arcuately curved actuator lever 50, which is generally channel-shaped in transverse cross section and underlies the tube 31, in use. The actuator lever 50 includes a pivot projection 51 extending forwardly therefrom into the bottom slot 46 of the sleeve 40 (FIGS. 3 and 4) and has a lateral bore 52 formed therethrough which is aligned in use with the pivot hole 47 in the sleeve 40 for receiving a pivot pin 53 for pivotally coupling the actuator lever 50 to the sleeve 40 for pivotal movement between a release position, shown in FIG. 3, and an actuating position, shown in FIG. 4. The actuator lever 50 has a generally triangularly shaped cam finger 54 which projects upwardly therefrom and extends in use into the slot 34 in the tube 31, the finger 54 having a sloping cam surface 55 along its forward edge and a stop surface 56 at its distal end, which is disposed for bearing engagement with the inner surface of the sleeve body 41 to limit movement of the actuator lever 50 in its actuating position (FIG. 4). The ring 44 of the sleeve 40 is encircled by a collar 58 (see also FIG. 8), which may be press fitted onto the ring 44 so as to conceal the mounting details. The sleeve assembly 35 may be formed of suitable thermally insulating plastic materials which, together with the insulating air gaps between the tube 31 and the actuator lever 50, the collar 58 and most of the length of the sleeve 40, protects a user's hand from exposure to excessive heat when, for example, the kettle 10 contains a boiling or very hot liquid.

Figure 10:
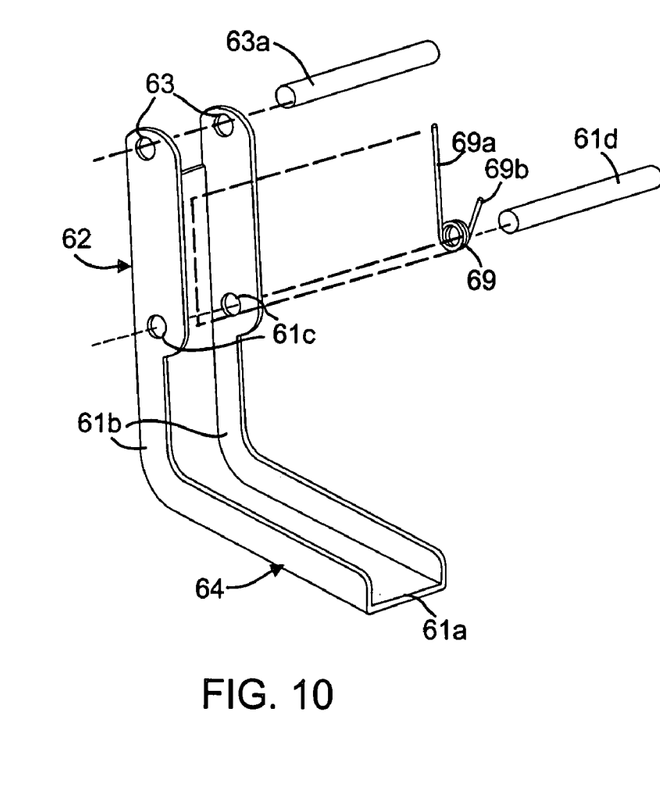
FIG. 10 is an enlarged perspective view of the crank arm of the linkage assembly of the teakettle of FIG. 1.

The kettle 10 also includes a linkage assembly, generally designated by the numeral 60, which includes a generally L-shaped crank lever 61 (see also FIG. 10) disposed within the vessel 11 and which may be substantially channel-shaped in transverse cross section, having a base wall 61a and side flanges 61b. One arm 62 of the crank lever 61 projects outwardly through the aperture 17 in the vessel sidewall 12 and up inside the spout liner 20. The arm 62 has aligned holes 61c formed through the side flanges 61b thereof for receiving a pivot pin 61d (FIGS. 3 and 10) which is also received through aligned holes in the liner 20 for pivotally mounting the crank lever 51 for movement between closing (FIG. 3) and opening (FIG. 4) positions. The distal end of the arm 62 of the crank lever 61 has coupling apertures 63 formed therein for receiving a coupling pin 63a which is, in turn, received in the slot 29 of the closure member arm 27. The crank lever 61 has a cam follower arm 64 which projects upwardly within the chamber 11a.

The linkage assembly 60 also includes an elongated rod 65 which is relatively rigid and extends through the hollow tube 31 of the handle assembly 30, being provided at longitudinally spaced-apart locations thereon with centering rings 66 for centering the rod 65 within the tube 31. If desired, bearing caps 67 and 68 may be respectively fitted on the opposite ends of the rod 65, the former bearing in use against the cam surface 55 of the actuator lever cam finger 54, and the latter bearing in use against the cam follower arm 64 of the crank lever 61. In this regard, the linkage assembly 60 may also include a torsion spring 69 (FIGS. 3, 4 and 10) which is wrapped coaxially around the pivot pin 61d and has opposite end legs 69a and 69d respectively bearing against the pivoted arm 62 of the crank lever 51 and the inner surface of the spout liner 20 for resiliently urging the crank lever 61 toward rotation in a counterclockwise direction, as viewed in FIG. 3. Thus, the crank lever 61 is biased to a normal rest position, shown in FIG. 3, holding the closure member 25 in its closed position closing the spout aperture 24, and holding the rod 65 in bearing engagement with the cam finger 54 of the actuator lever 50. The spring biasing force cooperates with gravity to hold the actuator lever 50 in its release position, illustrated in FIG. 3.

In operation, a user will lift the kettle 10 by grasping the sleeve assembly 35 of the handle assembly 30, with the palm of the hand resting against the sleeve or cover 40 and the fingers being wrapped beneath the actuator lever 50. When the user's finger are squeezed against the actuator lever 50 with sufficient force, it is pivoted in a counterclockwise direction, as view in FIG. 3, to its actuating position, shown in FIG. 4, this upward movement causing the cam surface 55 to cam the rod 65 forwardly through the tube 31, depressing the cam follower arm 64 of the crank lever 61 and pivoting it clockwise, as viewed in FIG. 4, thereby causing the coupling pin 63a to pivot the closure member 25 in a counterclockwise direction, as viewed in FIG. 4, i.e., inwardly of the spout 18, to its open position. It will be appreciated that the actuator lever 50 may be pivoted to open the spout aperture 24, whether or not the kettle 10 is actually lifted from an underlying support surface. Also, it should be noted that it may be possible to lift the kettle 10 without opening the spout aperture, depending upon the strength of the torsion spring 69. This spring may, for example, have a strength such that lifting of the kettle will not open the spout aperture unless the kettle is nearly filled with liquid. It may also be possible to lift a kettle 10 from its underlying support surface without opening the spout aperture, such as by wrapping the user's index finger under the collar 58 and leaving the remaining fingers loose against the actuator lever 50.

Significantly, the handle assembly 30 and the linkage assembly 60 cooperate to provide an opening and closing of the spout 18 in a manner such that the closure member 25 does not pivot outwardly of the spout 18 and, also, the spout 18 and the handle assembly 30 cooperate to substantially conceal the linkage assembly from view in use. Also, the sleeve assembly 35 provides an open arrangement which permits viewing of the tube 31 and emphasizes the spacing between the sleeve assembly 35 and the tube 31, so that the thermally insulating characteristics are apparent to a user. Also, the opening and closing mechanism does not depend upon gravity or the weight of the kettle to control the opening and closing operation.

If desired, suitable means (not shown) may be provided to block steam in the storage chamber 11a from entering the hollow tube 31 of the handle assembly and possibly exiting near the user's hand at the slot 34.

In a constructional model of the teakettle 10, the vessel side wall 12, bottom wall 13, lid 15, tube 31 and rod 65, as well as the several pivot pins and the spring 69, may be formed of suitable metals, and at least those of the sidewall 12 and bottom wall 13 may have good thermal conductivity. The rest of the parts may be formed of suitable plastic materials, which may be heat-resistant. Also, at least the sleeve 40, the actuator lever 50 and the collar 58 are formed of materials having good thermal insulation characteristics.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A portable liquid container comprising:
   a vessel defining a liquid storage chamber and having a spout communicating with the chamber,
   a handle assembly connected to the vessel and including a hollow portion communicating with the chamber,
   a closure member disposed within the spout and capable of movement between a closed position closing the spout and an open position accommodating flow of liquid through the spout,
   a bias structure resiliently urging the closure member to the closed position,
   an actuator carried by the handle assembly and capable of movement between actuating and release positions, and
   a linkage assembly extending through the hollow portion of the handle assembly and coupling the actuator to the closure member for moving the closure member disposed within the spout to its open position in a direction inwardly of, and maintained within the spout in response to movement of the actuator to its actuating position.

2. The container of claim 1, wherein the closure member is pivotally movable between its open and closed positions and the actuator is pivotally movable between its actuating and release positions.

3. The container of claim 1, wherein the actuator includes a cam structure and the linkage assembly includes a cam follower structure disposed in camming engagement with the cam structure.

4. The container of claim 1, wherein the vessel is provided with a filing aperture in an upper end thereof.

5. The container of claim 4, and further comprising a lid removably mounted on the vessel for closing the filling aperture.

6. The container of claim 4, wherein the handle assembly spans the filling aperture.

7. The container of claim 1, and further comprising a liner disposed within the spout, the closure member being mounted on the liner structure.

8. A portable liquid container comprising:
   a vessel defining a liquid storage chamber and having a spout communicating with the chamber,
   a handle assembly including a hollow metal tube connected to the vessel and communicating with the chamber,
   the handle assembly including a thermally insulating sleeve assembly enclosing a portion of the tube and having an actuator portion movable between actuating and release positions,
   a closure member disposed within the spout for movement between a closed position closing the spout and an open position accommodating flow of liquid through the spout,
   a bias structure resiliently urging the closure member to the closed position, and
   a linkage assembly extending through the tube and coupling the actuator portion to the closure member for moving the closure member disposed within the spout to its open position in a direction inwardly of, and maintained within the spout in response to movement of the actuator portion to its actuating position.

9. The container of claim 8, wherein the sleeve assembly includes a portion overlying the tube, the actuator portion being disposed beneath the tube.

10. The container of claim 8, wherein the actuator portion includes a cam structure and the linkage assembly includes a cam follower structure disposed in camming engagement with the cam structure.

11. The container of claim 8, wherein the linkage assembly includes spacing structure for centering within the tube the portion of the linkage assembly extending through the tube.

12. The container of claim 8, wherein the tube has a slot formed therein, the actuator portion extending through the slot for engagement with the linkage assembly.

13. The container of claim 8, wherein the actuator portion is carried by the sleeve assembly for pivotal movement between the actuating and release positions thereof.

14. A method of opening and closing a spout of a kettle having a storage chamber and a hollow tubular handle communicating with the chamber, the method comprising the steps of:
    disposing a closure member within the spout and an actuator on the handle,
    concealing a linkage assembly within the chamber and the handle for coupling the actuator to the closure member, and
    moving the actuator in response to grasping of the handle by a user's hand to move the closure member disposed within the spout inwardly of the spout to an open position which maintains the closure member within the spout.

15. The method of claim 14, and further comprising the step of moving the linkage assembly coaxially within the handle in response to movement of the actuator.

16. The method of claim 14, and further comprising the step of thermally insulating at least a portion of the tubular handle to protect a user's hand.

17. The method of claim 14, wherein the step of moving includes the step of pivotally moving the actuator and the closure member.

18. The method of claim 17, and further comprising the step of leaving a portion of the tubular handle exposed to view.

\* \* \* \* \*